April 6, 1948. H. R. LEGATSKI 2,439,307
RECOVERY AND PURIFICATION OF CYCLOPENTADIENE
Filed Oct. 18, 1945
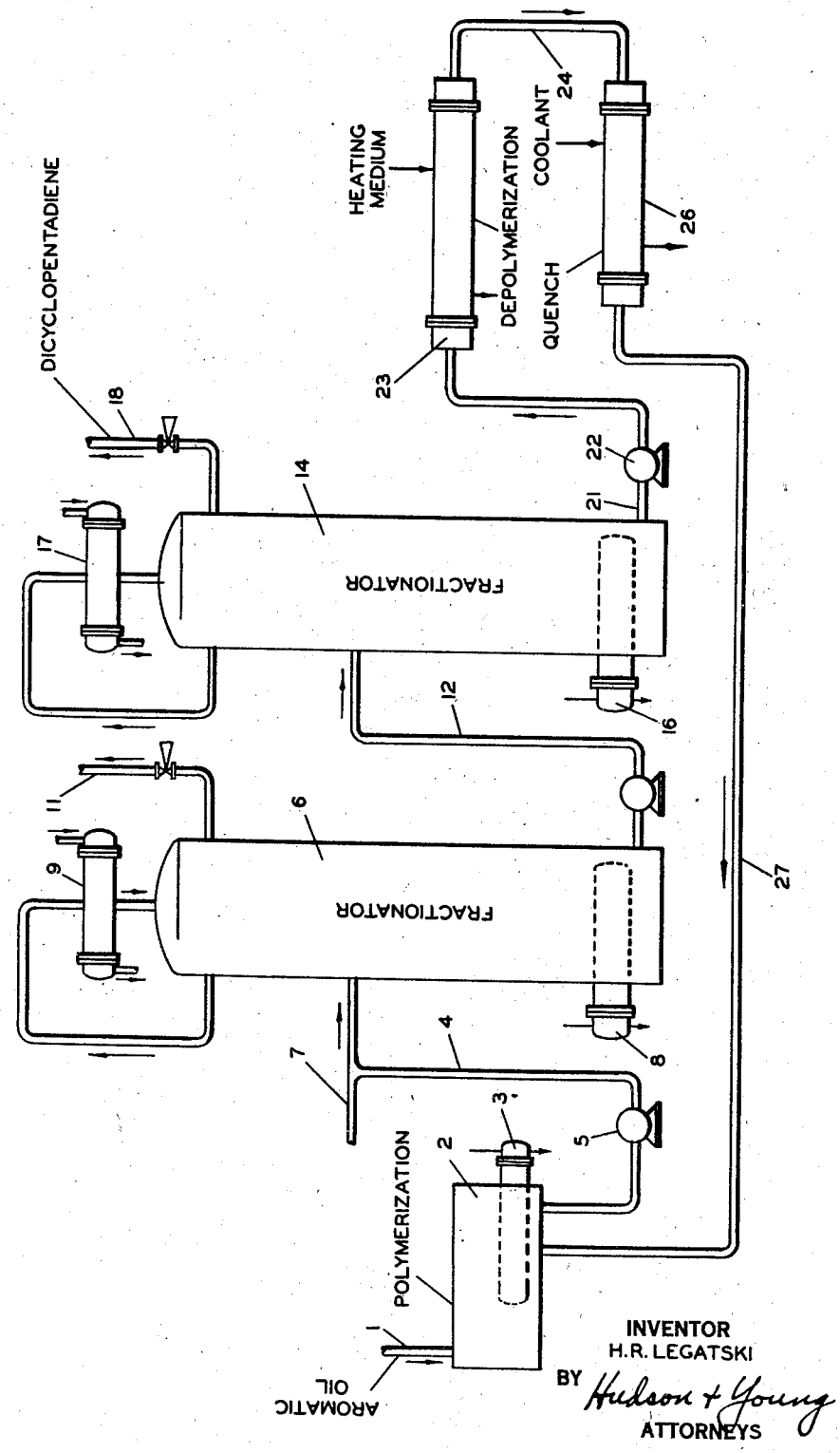
INVENTOR
H.R. LEGATSKI
BY Hudson + Young
ATTORNEYS Patented Apr. 6, 1948

2,439,307

UNITED STATES PATENT OFFICE 2,439,307

RECOVERY AND PURIFICATION OF CYCLOPENTADIENE

Harold R. Legatski, Bartlesville, Okla., assignor to Phillips Petroleum Company, a corporation of Delaware Application October 18, 1945, Serial No. 623,147

1 Claim. (Cl. 260—666)

This invention relates to a process for the purification of hydrocarbons. The process of this invention is particularly applicable to the recovery and purification of cyclopentadiene as the dimer from a mixture of cyclopentadiene and other hydrocarbons.

"Aromatic oils" are produced as by-products of hydrocarbon conversion processes. These aromatic oils include aromatic hydrocarbons in admixture with aliphatic and alicyclic hydrocarbons of similar boiling points. These aromatic oils are produced in hydrocarbon conversion and refining operations such as cracking, dehydrogenation, and other high temperature operations. Cracking and dehydrogenation processes yield mixtures of cyclic hydrocarbons as by-products. Certain reforming operations, e. g. cyclization or aromatization, produce cyclic hydrocarbons as the principal product of the reaction. The aromatic oil fraction from some cracking processes comprises benzene, toluene, piperylene, isoprene, and cyclopentadiene. These hydrocarbons are produced as by-products also from the high temperature pyrolysis of ethane, propane, butane, or mixtures of these low-boiling paraffins. Dehydrogenation of butane to unsaturated $C_4$ hydrocarbons and dehydrogenation of butylenes to butadiene yield aromatic oils. The aromatic oil produced by high temperature conversion of light hydrocarbons, e. g. $C_2$ to $C_4$ hydrocarbons, is generally obtained as a high boiling residual after separation of $C_4$'s and lighter hydrocarbons.

Cyclopentadiene in relatively pure form is valuable for use in coatings, e. g. paints and varnishes, and in the manufacture of plastics, synthetic rubber, etc. Monomeric cyclopentadiene is subject to autopolymerization. The polymerization reaction is exothermic and is catalyzed by elevated temperature. Hence relatively pure monomeric cyclopentadiene may undergo violent spontaneous polymerization with the result that various polymers are formed which are of little or no value to the consumer. For this reason, it is preferable to convert cyclopentadiene to dicyclopentadiene and to store and ship the product in this form. The consumer, a paint manufacturer for example, may then convert the dimer to the monomer when it is to be used. The dimer of cyclopentadiene, i. e. dicyclopentadiene, is relatively easily depolymerized to the monomer. The higher polymers, on the other hand, may be depolymerized only with considerable difficulty, as will be brought out in greater detail hereinafter, and in any event do not give clean cut depolymerization to the monomer. Present practice is to discard all trimer and heavier polymer.

The recovery and purification of cyclopentadiene from any aromatic oil fraction in which it occurs is complicated by many factors. Cyclopentadiene occurs in admixture with other close boiling hydrocarbons. Because of the presence of other hydrocarbons having boiling points the same as or close to the boiling point of cyclopentadiene, it is not possible to separate pure cyclopentadiene from such a mixture by conventional fractional distillation. It is known that cyclopentadiene may be converted to dicyclopentadiene without substantial polymerization of isoprene, piperylene or other components of the aromatic oil fraction. The patent to Ward, U. S. Patent No. 2,211,038, discloses polymerization of cyclopentadiene in the presence of other components of aromatic oil mixtures. In accordance with the process of said Ward patent, the polymerization is carried out at elevated temperature and pressure. According to U. S. Patent 2,362,227 to Wells, et al. cyclopentadiene in such a mixture may be dimerized at atmospheric temperature if the aromatic hydrocarbons are first separated therefrom as by fractional distillation. Regardless of the method employed for polymerizing cyclopentadiene, polymers heavier than the dimer are formed. These higher polymers contaminate the dicyclopentadiene and if separated therefrom represent a substantial loss of cyclopentadiene. By the process of the present invention substantially all of the cyclopentadiene originally present in an aromatic oil fraction may be recovered in the form of substantially pure dicyclopentadiene.

An object of this invention is to provide an improved method for the recovery of cyclopentadiene. Another object is to provide an improved process for the recovery of cyclopentadiene from aromatic oils. Another object is to provide such a process to recover substantially all of the cyclopentadiene content of a hydrocarbon mixture containing same in the form of the dimer, dicyclopentadiene. Another object is to provide a process wherein cyclopentadiene may be recovered from its higher polymers. Still another object is to provide a process for depolymerizing cyclopentadiene polymers higher than the dimer. Other objects and advantages will be evident from the following detailed description and the accompanying drawing.

The accompanying drawing is a diagrammatic view in elevation of apparatus suitable for carrying out the present invention.

By the process of the present invention cyclopentadiene is recovered from a mixture containing same as substantially pure dicyclopentadiene. Substantially all of the cyclopentadiene content of the feed stock is recovered regardless of the form, monomer, dimer, or higher polymer, in which it exists in the feed. The aromatic oil is subjected to conditions which effect polymerization of cyclopentadiene without substantial polymerization of other components. The effluent of the polymerization step is subjected to fractional distillation to separate the cyclopentadiene polymers from lower boiling components. The cyclopentadiene dimer and higher polymers are then subjected to fractional distillation at subatmospheric pressure to effect separation of dicyclopentadiene from higher polymers. The higher polymers are subjected to conditions such that depolymerization takes place and the regenerated cyclopentadiene is then recovered in the separation steps.

It is preferable to carry out the polymerization under conditions which favor the formation of dicyclopentadiene rather than higher polymers. Temperatures within the range of atmospheric to about 300° F. are known to be satisfactory for the polymerization reaction; temperatures below 200° F. are preferred for best yields of dicyclopentadiene. Catalysts are not necessary for the reaction; it will take place at temperatures of from 150° F. or lower to 300° F. or higher in the absence of catalysts.

The process of the present invention is applicable directly to hydrocarbon fractions of comparatively wide boiling range. It is sometimes advantageous to separate from the original aromatic oil a fraction having a rather narrow boiling range and containing the cyclopentadiene. Often it will be found desirable to fractionally distill the aromatic oil for the removal of aromatics, i. e. benzene, toluene, prior to polymerization since these apparently delay the polymerization of cyclopentadiene.

Since dicyclopentadiene and the higher polymers of cyclopentadiene boil at temperatures much higher than the other components of the aromatic oil mixture, the separation of polymer may be readily accomplished by simple fractional distillation. Dicyclopentadiene boils at a temperature of about 342° F. as compared with 232° F. for toluene and 176° F. for benzene. The separation of dicyclopentadiene from the higher polymers is readily effected by fractional distillation at reduced pressure. The temperature at which this separation is effected is limited practically to a temperature of about 220° F. At a temperature above about 220° F. dicyclopentadiene polymerizes rapidly to higher polymers. The distillation may be aided by use of a suitable stripping medium free from oxygen. Steam, nitrogen, and light hydrocarbon gases are suitable for use in stripping the dicyclopentadiene from the higher polymers. The fractionation may be readily accomplished at a pressure of approximately 25 mm. mercury absolute without the use of a stripping medium. Pressures within the range of 10 to 20 mm. mercury absolute are preferred.

The depolymerization step is best carried out under conditions of relatively high temperature and relatively short heating time. Low pressures are advantageous, but the depolymerization reaction may be carried out satisfactorily at atmospheric or slightly elevated pressure. Depolymerization may be carried out at temperatures within the range of 750 to 1100° F.; a temperature within the range of 850 to 950° F. is preferred with a residence time, or heating time, within the range of about 10 to about 30 seconds. In general, the lower heating time is employed at the higher temperature, although there is an allowable range at any given temperature. It is generally desirable to operate the depolymerization step with limited depolymerization per pass with recycle of the unconverted polymer. As an aid to the depolymerization, an inert diluent may be used. Nitrogen, steam, and light hydrocarbon gases may be used as diluents. Steam is particularly effective as an aid in the depolymerization.

Operation of the process of the present invention is illustrated by the accompanying drawing depicting a specific embodiment of the invention. The aromatic oil fraction containing cyclopentadiene enters through pipe 1 and is fed continuously to the polymerization unit 2. The polymerization is preferably carried out at a slightly elevated temperature. A temperature of about 200° F. is about the optimum for dimerization at a reasonably rapid rate without excessive formation of higher polymers. The polymerization rate increases rapidly with increase in temperature within the range of 200 to 300° F. At temperatures above about 220° F., however, conversion of dicyclopentadiene to higher polymers proceeds at a rather rapid rate. The temperature is controlled by a suitable heat exchanger 3. It is necessary to raise the temperature of the aromatic oil to the point at which polymerization proceeds at a rapid rate, then remove heat as liberated by the exothermic polymerization reaction to control the temperature of polymerization. In continuous operation, heat exchanger 3 usually functions as a cooler to remove the heat of reaction; however it is desirable to arrange the heat exchanger to also supply heat for initiation of the polymerization reaction. From the polymerizer, the aromatic oil containing cyclopentadiene in the form of polymers is transferred via line 4 by pump 5 to the first fractionator 6. The aromatic oil feed may, alternatively, be introduced directly into fractionator 6 from line 7. This latter feed entry is used instead of line 1 for aromatic oil feed stocks containing cyclopentadiene dimer and little, if any, monomeric cyclopentadiene.

Fractionator 6 is preferably a conventional bubble cap column provided with a suitable reboiler 8 at its base and a reflux condenser 9 supplying reflux to the top of the column. This fractionator may be operated at substantially atmospheric pressure or at a slightly elevated pressure. A pressure of about 5 pounds per square inch absolute is satisfactory. In fractionator 6 the components of the aromatic oil mixture other than cyclopentadiene polymers are taken overhead via line 11. The cyclopentadiene polymers are removed from the bottom of the column and passed via line 12 by means of pump 13 to a second fractionator 14. Fractionator 14 is provided with a reboiler 16 and with a reflux condenser 17 in conventional manner. This fractionator is operated under conditions such that the dicyclopentadiene may be taken overhead while maintaining a reboiler temperature not in excess of 220° F. This fractionation may be carried out satisfactorily at a pressure of about 20 mm. of mercury absolute. Dicyclopentadiene is taken overhead as product via line 18.

The polymers of cyclopentadiene higher than dicyclopentadiene are withdrawn from the bottom of fractionator 14 via line 21 and transferred by means of pump 22 to the depolymerization unit 23. In the depolymerization unit the temperature of the polymer is rapidly raised to a value within the range of 850 to 950° F. by heat exchange with a suitable heating medium. The mixture of monomer and polymer effluent of the depolymerization zone is passed via line 24 to a quench zone 26 where its temperature is rapidly reduced to a value of about 250° F. or below. The mixture of monomer and polymer is then passed via line 27 to the polymerization zone as recycle. It will be evident that by depolymerizing the higher polymers of cyclopentadiene in accordance with the present invention, substantially all of the cyclopentadiene content of the original feed stock is recovered.

A feed stream having the following composition is fed to apparatus essentially as illustrated in the drawing. The aromatic oil is a by-product obtained from the high temperature pyrolysis of propane.

| Fraction | Liquid vol. percent |
|---|---|
| C₅ (paraffins and olefins) | 16.9 |
| Benzene | 45.9 |
| Cyclopentadiene | 27.1 |
| Toluene | 4.2 |
| Heavier than toluene | 5.9 |
| | 100.0 |

This feed stock is heated to 200° F. and held at that temperature in the dimerizer under sufficient pressure to maintain liquid phase. The rate of flow and the volume in the dimerizer is such that the feed stock has an average residence time in the dimerizer of about 36 hours. Approximately 99 per cent of the cyclopentadiene is polymerized. In comparative tests with this same feed, approximately 98 per cent of the cyclopentadiene polymerized in 4 hours at 250° F., while approximately 97 per cent polymerized in 45 minutes at 300° F. The polymerized feed is fractionally distilled, first at 5 pounds per square inch gage, effecting removal of substantially all components lower boiling than dicyclopentadiene, and then at 20 mm. mercury absolute, effecting separation of dicyclopentadiene from higher polymers. The maximum temperature employed in the distillation steps is about 212° F., the approximate kettle temperature of the fractional distillation units.

The bottom product from the vacuum fractionation passes to a depolymerization step where it is rapidly heated to about 900° F. for a period of approximately 20 seconds. The effluent of the depolymerization step is quenched to 200° F. and recycled to the polymerizer. The following is an analysis of the effluent of the depolymerization step.

| Component | Wt. per cent |
|---|---|
| Light products | 3 |
| Cyclopentadiene | 15 |
| Unconverted | 75 |
| Coke and tars | 7 |

The unconverted polymer is recycled through the polymerization and separation steps to the depolymerization step. About 60 wt. per cent of the heavy polymer is ultimately reconverted to cyclopentadiene in the depolymerization step.

From the foregoing it will be evident that the present invention provides an improved process for the recovery and purification of cyclopentadiene. The present invention provides efficient polymerization of cyclopentadiene to dicyclopentadiene and recovery of cyclopentadiene from higher polymers. This combination when taken in conjunction with the separation steps results in a highly efficient process for the recovery of cyclopentadiene as susbtantially pure dicyclopentadiene. Many advantages of the improved process of my invention will be apparent to those skilled in the art.

I claim:

A process for recovering cyclopentadiene in the form of dicyclopentadiene from a mixture of close-boiling hydrocarbons containing the same which comprises subjecting said mixture to an elevated temperature within the range of 200 to 220° F. for a period of time such that substantially all of the cyclopentadiene content of said mixture is polymerized to dicyclopentadiene and higher polymers without substantial polymerization of other close-boiling hydrocarbons in the mixture, fractionally distilling from the resulting cyclopentadiene polymers substantially all of the lower boiling components present in said mixture, subjecting the cyclopentadiene polymers to a second fractional distillation at subatmospheric pressure under conditions such that the distillation temperature is not above about 220° F. effecting separation of substantially pure dicyclopentadiene from higher boiling cyclopentadiene polymers, subjecting said higher boiling polymers in vapor phase at substantially atmospheric pressure to an elevated temperature within the range of from 750 to 1100° F. for a period of time within the range of 10 to 30 seconds whereby said higher polymers are depolymerized to monomeric cyclopentadiene, and recycling said monomeric cyclopentadiene together with unconverted higher polymers to the polymerization step.

HAROLD R. LEGATSKI.

REFERENCES CITED

The following references are of record in the file of this patent:

UNITED STATES PATENTS

| Number | Name | Date |
|---|---|---|
| 2,211,038 | Ward | Aug. 13, 1940 |
| 2,362,227 | Wells et al. | Nov. 7, 1944 |

OTHER REFERENCES

Kronstein Berichte, vol. 35, 4150-2 (1902). (Patent Office Library.)

Staudinger et al., Annalen, vol. 447, 97 to 110 and 122 (1926).